United States Patent

[11] 3,583,763

| [72] | Inventors | Raymond J. Settimi<br>Woodland Hills;<br>John N. Broughton, Sylmar, Calif. |
|---|---|---|
| [21] | Appl. No. | 852,827 |
| [22] | Filed | Aug. 25, 1969 |
| [45] | Patented | June 8, 1971 |
| [73] | Assignee | American Safety Equipment Corporation<br>New York, N.Y. |

[54] LINEAR SAFETY BELT RETRACTION DEVICE
7 Claims, 7 Drawing Figs.

[52] U.S. Cl. ............................................ 297/388,
280/150B, 297/389, 242/47.5
[51] Int. Cl. ....................................... B60r 21/10,
A62b 35/00
[50] Field of Search............................. 242/55.01,
107.SB, 107.4; 297/385, 386, 388, 389;
280/150SB, 242/1, 55, 47.5

[56] References Cited
UNITED STATES PATENTS

| 3,184,267 | 5/1965 | Rumble | 297/388 |
| 3,371,960 | 3/1968 | Bayer et al. | 297/386 |
| 3,439,933 | 4/1969 | Jantzen | 280/150 |
| 3,472,552 | 10/1969 | Hopka et al. | 297/388 |
| 3,486,792 | 12/1969 | Stoffel | 297/389X |

Primary Examiner—Stanley N. Gilreath
Assistant Examiner—Werner H. Schroeder
Attorney—Miketta, Glenny, Poms & Smith ABSTRACT: A linear safety belt retraction device for use in a safety belt restraint system in a vehicle for withdrawing the safety belt to an out-of-the-way position when not in use including an elongated frame, a buggy mounted for longitudinal movement with respect to the frame from a retracted belt position to a protracted belt position, one end of the safety belt secured to the frame and the other end carrying a connector, an intermediate portion of the safety belt engaging the buggy, a spring device for biasing the belt to a retracted position, a releasable latching device for maintaining the buggy in the protracted position including an elongated rod carried by the buggy, a spring-biased dog element engaging the rod and preventing movement of the buggy when the belt is fully protracted, and a manually operable member disengaging the dog element and rod so as to allow the buggy to move the belt to the retracted position. In one embodiment the rod comprises an inflexible straight member, while in a second embodiment, the rod comprises a plurality of block segments hinged along one side so as to be foldable into a circular housing when the belt is in the fully retracted position.

PATENTED JUN 8 1971 3,583,763

INVENTORS.
RAYMOND J. SETTIMI
JOHN N. BROUGHTON
By
Miketta, Glenny, Poms & Smith
ATTORNEYS.

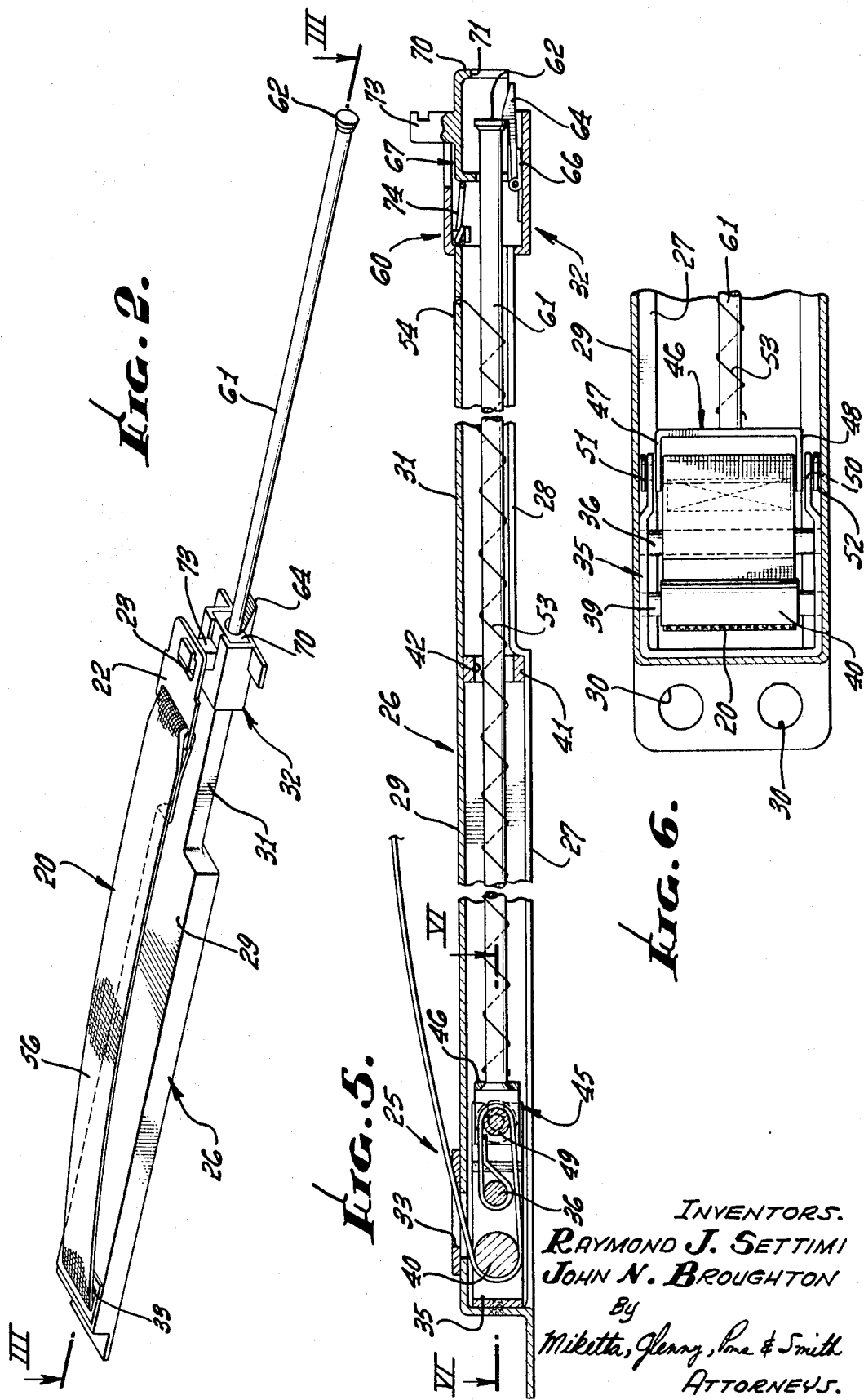

PATENTED JUN 8 1971
3,583,763
SHEET 3 OF 3
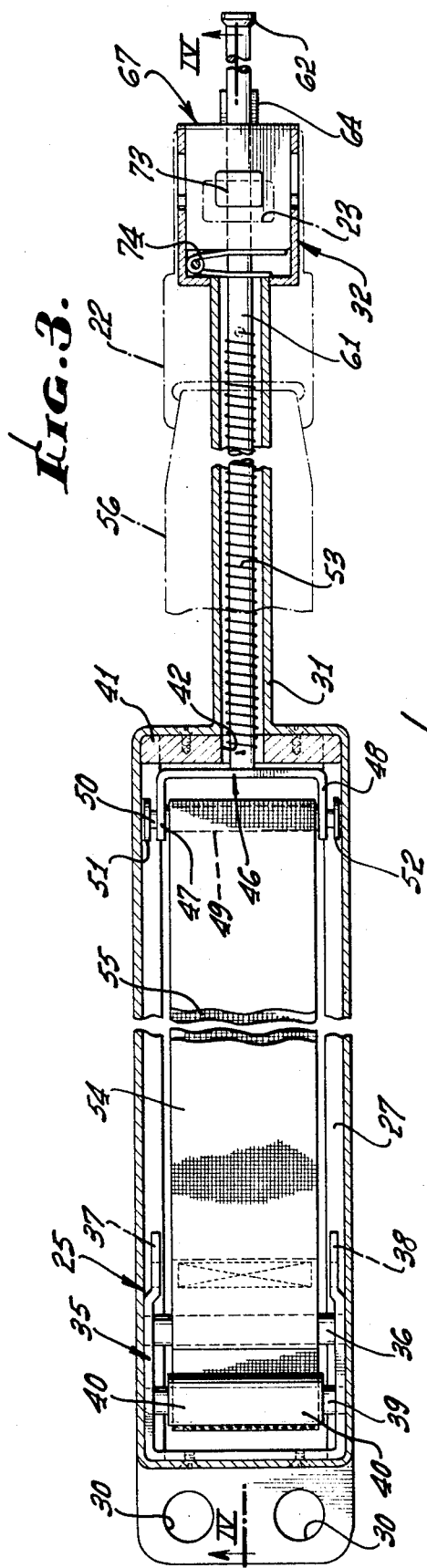
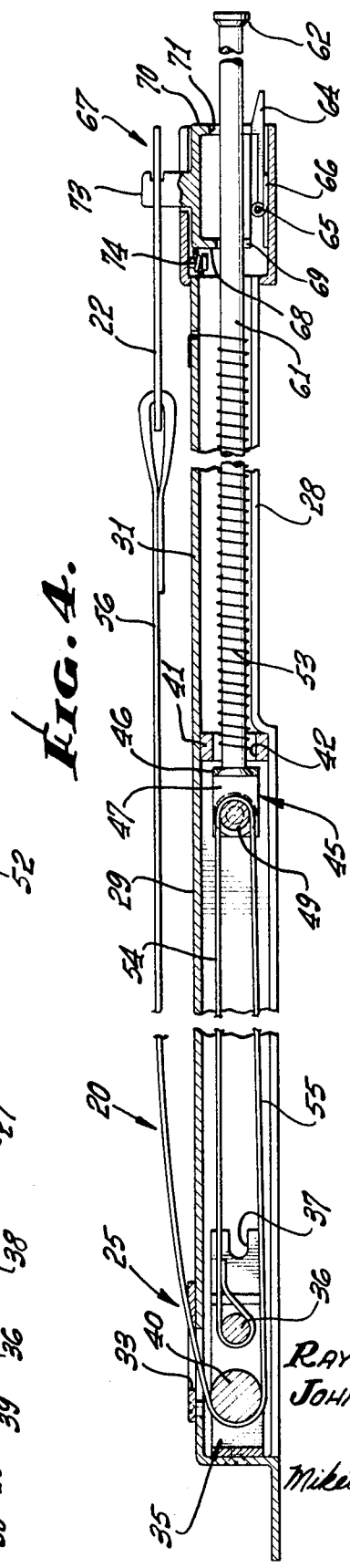
INVENTORS.
RAYMOND J. SETTIMI
JOHN N. BROUGHTON
By
Miketta, Glenny, Poms & Smith
ATTORNEYS.

LINEAR SAFETY BELT RETRACTION DEVICE

BACKGROUND OF THE INVENTION

It is well known in safety belt restraint systems to mount one or more of the safety belts through a retraction device for withdrawing the safety belt into an out-of-the-way position when not in use. In this manner, entanglement of the safety belt members is prevented and the connectors secured to the free ends of the safety belts are removed when not in use to prevent their inconvenience, annoyance and unsightly appearance. Since the use of a shoulder belt has become prevalent in automobile restraint systems, it has been necessary to provide some device which can be ceiling mounted and will withdraw the shoulder belt to the out-of-the-way position. Because of the relatively long length of the shoulder belt as opposed to seat belts, the common type of retractor employing a reel about which the belt is wound is somewhat undesirable because of the large volume which it requires when the belt is fully retracted which presents an unsightly appearance in the headliner of the automobile. A linear device has advantages in retracting such a long belt.

It is thus an object of the present invention to provide a linear device for use in a safety belt restraint system which is capable of retracting a belt of substantial length. It is another object to provide such a linear device which can be substantially concealed behind the headliner of the automobile without any unsightly large protuberance. One more object of the present invention is to provide a linear device as previously described including means for latching the safety belt in the extended position and which will be manually tripped so as to retract the belt when the loose end of the belt carrying the connector has been removed from the region in which it may accidentally strike the passenger during retraction. Yet another object of one embodiment of the present invention is to provide a linear device as above described which does not require substantial longitudinal space for operation. Other advantages and objects of this invention will become more clear when considered in connection with the following description and the attached drawings.

SUMMARY OF THE INVENTION

In a safety belt restraint system including at least one safety belt having a connector at one end thereof, the provision of retraction means including a frame and a buggy mounted for limited longitudinal movement with respect thereto from a belt retracted to a belt-protracted position, the other end of the safety belt secured to the frame and having the intermediate portion engaging the buggy, means biasing the belt into the retracted position, and releasable latching means for maintaining the buggy in the protracted position including an elongated rod carried by the buggy, a spring biased dog element engaging the rod when the belt is fully protracted, a member selectively movable so as to disengage the dog element and rod allowing the buggy to move to the belt retracted position. In one exemplary embodiment, the rod is straight and elongated, and in the of the exemplary embodiment, the rod is foldable into a small space.

BRIEF DESCRIPTION OF THE DRAWINGS

FIG. 2 is a perspective view of one embodiment of a retraction device in accordance with the present invention;

FIG. 3 is a sectional view taken along the plane III–III of FIG. 2;

FIG. 4 is a sectional view taken along the plane IV–IV of FIG. 3;

FIG. 5 is a sectional view as in FIG. 4 showing the device in the belt-retracted position;

FIG. 6 is a partial sectional view taken along the line VI–VI of FIG. 5; and

BRIEF DESCRIPTION OF THE PREFERRED EMBODIMENTS

Figure 1:
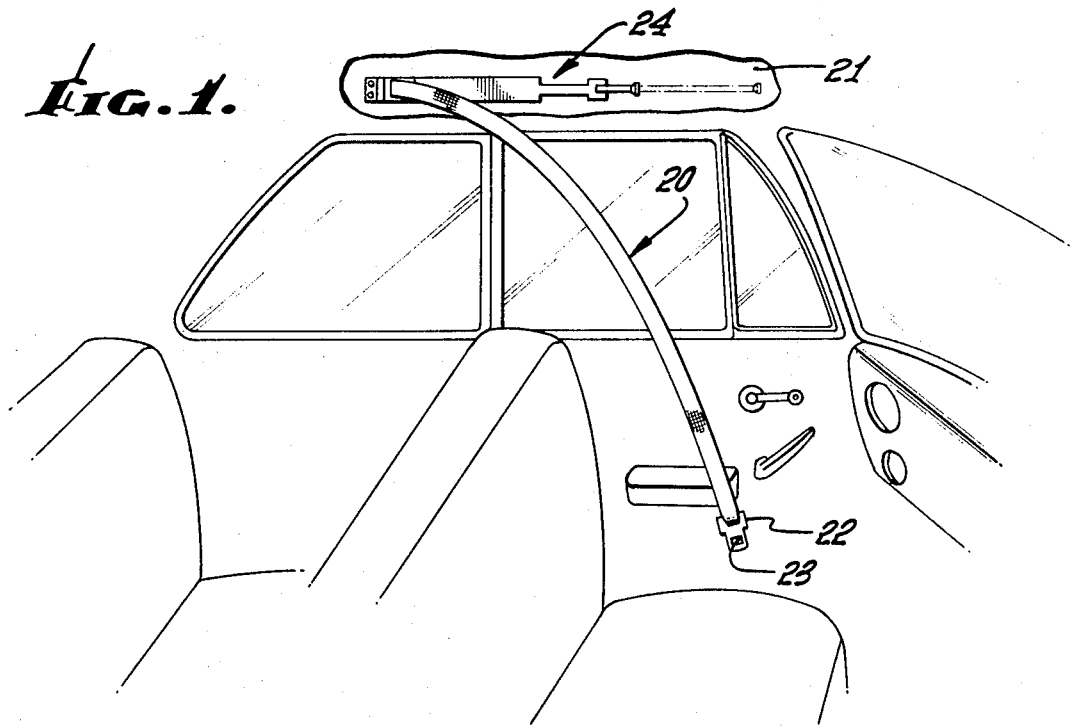
FIG. 1 is a schematic view of one exemplary embodiment of a retraction device for use in a safety belt restrain system shown mounted in an automobile and constructed in accordance with the present invention.

Referring now to FIG. 1, there is shown a safety belt restraint system including one shoulder belt 20 mounted at its upper end to the ceiling 21 of the automobile behind the headliner and having a connector, such as a tongue plate 22, at the free end thereof. As is well known in the art, the tongue plate 22 is engageable with a complementary connector (not shown) which may extend upward from the floor so that the safety belt 20 may be positioned during use diagonally across the chest of the passenger. The tongue plate 22 has an opening 23 for engaging the complementary buckle. The ceiling end of the shoulder belt is mounted through a retraction device indicated generally at 24.

The retraction device 24 generally includes retraction means, indicated generally at 25 and releasable latching means indicated generally at 60.

In the exemplary embodiments, retraction means 25 includes a housing or frame 26 including a base 27 having a neck portion 28, a cover 29 having mounting holes 30 at one end thereof, and including a neck cover portion 31. The forward end of the housing 26 comprises a latch housing 32. In one end of cover 29, as seen in FIG. 2, there is provided an opening 33 through which the safety belt 20 passes. The opening 33 may be flush with a registered opening in the headliner of the automobile. The remainder of the housing 26, of course, is hidden behind the headliner and is secured to the ceiling of the automobile.

Within housing 26 there is provided a U-shaped end member indicated generally at 35 mounted on base 27 and supporting a pin 36 between the legs thereof on which one end of the shoulder belt 20 is secured. At the forward or inner end of the legs of the U-shaped member 35 there is provided notches 37, 38 for reasons to be explained more fully hereinafter. Mounted toward the outer end of the U-shaped member 35 is an axle 39 on which a roller 40 is rotatably mounted between the legs of the U-shaped member and below the opening 33 in the cover 29. Also mounted within the housing and at the end of the frame 27 opposite from the U-shaped member 35 there is provided a stop wall 41 having an opening 42 therethrough.

A buggy, indicated generally at 45, is disposed within housing 29 and mounted for limited longitudinal movement with respect to the frame or housing. In the exemplary embodiment, the buggy 45 comprises a U-shaped member 46 including legs 47, 48 between which a roller 49 is rotatably mounted on an axle 40. At the ends of axle 50 there are fixedly mounted guides 51, 52 adjacent the sidewalls of the housing cover 29 for aligning the buggy laterally and vertically. When the safety belt 20 is in the fully retracted position, as seen in FIG. 5, the outboard ends of the axle 50 are received in the notches 37, 38.

The retraction means 25 also includes a spring 53 secured at one end to the housing at 54 and at the other end adjacent the buggy U-sahped member 46.

As seen best in FIG. 4, the shoulder belt 20 is secured through a loop around pin 36 at one end of the housing or frame and extends from said pin to the roller 49 on buggy 45 to define a first lay 54, around the roller 49 back toward the stationary roller so to define a second lay 55, and around said stationary roller 40 and through the opening 33 in the cover 29 so as to define a third lay 56 which is disposed around the passenger or occupant when the shoulder belt is in use.

The releasable latching means 60 in the exemplary embodiment comprises an elongated rod 61 supported at one end by the U-shaped frame member 46 of buggy 45 and passes through opening 42 in wall 41 at one end of base 27. The rod 61 has a head portion 62 at it free end. The exemplary releasable latching means also includes a dog element 64 pivotally mounted within the housing or frame 29 on pin 65 and biased upwardly by spring 66.

The latching means in the first exemplary embodiment also comprises a member indicated generally at 67 which is selectively slidably movably mounted with respect to the latch housing 32. The member 67 includes a rear wall 68 having an opening 69 and a front wall 70 having an opening 71 through which the rod 61 and head 62 may pass. The front wall 70 defines a portion for camming the dog element 64 out of the way. In this exemplary embodiment, the member 67 includes a hooklike portion 73 received within the opening 23 in tongue plate 22 on shoulder belt 20 when the belt is in the out-of-the-way position. Member 67 is biased by a spring 74 to a forward position allowing rod 61 and head 62 to pass through openings 69, 71.

In operation, assume that the shoulder belt 20 is in the fully retracted position as shown in FIG. 4. In this condition, it will be seen that buggy 45 is moved to the forward end of the base 27 of the housing adjacent the abutment wall 41 through the bias of spring 53. When the belt is protracted, the tension on the lay 56 and subsequent tension on lay 55 will draw the buggy 45 rearwardly so that layers 54, 55 decrease in length while lay 56 extends so that the shoulder belt 20 is in the protracted state. When fully protracted, the rod 61 will have been drawn rearwardly by buggy 45 so that head 62 will be drawn through opening 71 in wall 70 of member 67 and bias dog element 64 out of the way until the end of the head 62 passes the abutment edge on the dog element. At this point, the axle outboard ends 50 on buggy 45 are received in the notches 37, 38 in U-shaped end frame member 35. The buggy 45 is locked in the belt-protracted position. During an emergency, when the shoulder belt 20 is loaded, such load will be transmitted through the belt 20, around the stationary roller 40, around the buggy roller 39 abutting U-shaped end frame member 35 and finally to the pin 36. It will thus be seen that the entire load carried by the belt will be transmitted to the frame or housing of the retracted device.

When use of the belt by the passenger is completed, the tongue plate 22 may be grasped by the passenger and mover to the ceiling so that the hooklike portion 73 is received in opening 23 in the tongue plate. When the passenger manually moves the tongue plate rearwardly, the movable member 67 is slid rearwardly so that the front wall 70 cams the dog element 64 out of the way so that the head 62 on rod 61 is released or disengaged allowing the rod to move forwardly under the influence of spring 53. Movement of the buggy 45 increases lays 54, 55 so as to retract the belt-shortening lay 56. When lay 56 is sufficiently shortened, the spring bias will produce a tension in lay 56 so that it is held between roller 40 and hooklike portion 73 adjacent the headliner of the automobile in the out-of-the-way position.

Figure 7:
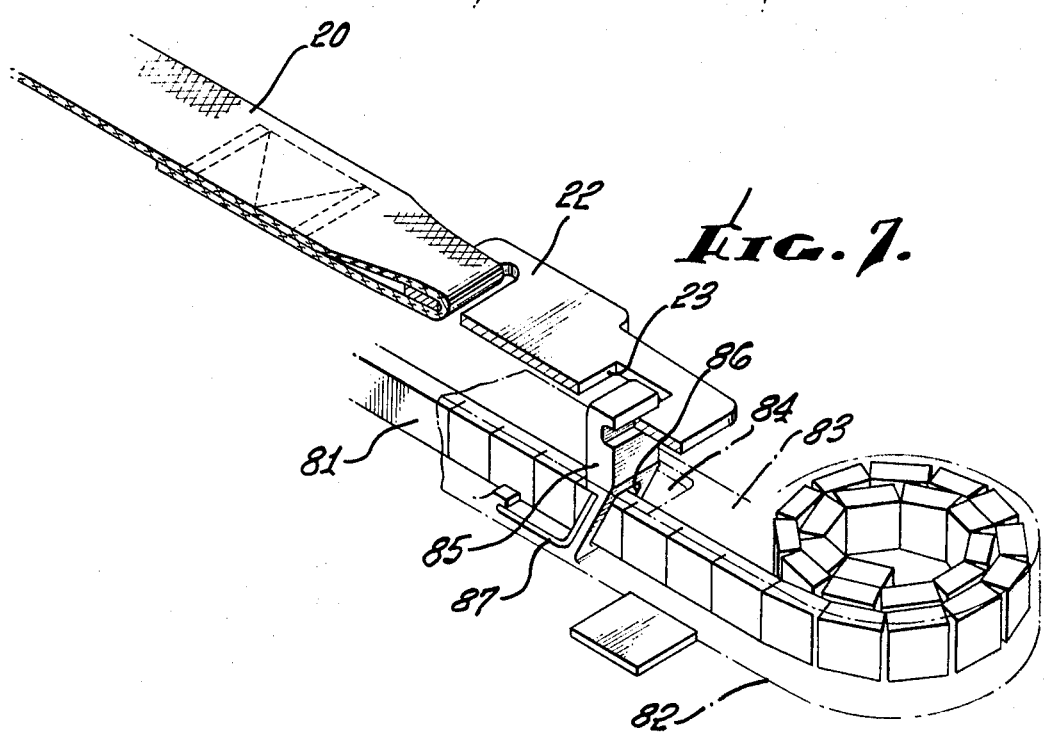
FIG. 7 is a partial perspective view of a second embodiment of a retraction device constructed in accordance with the present invention.

Referring now to the second exemplary embodiment of releasable latching means shown in FIG. 7, there is shown an elongated rod 81 carried by a buggy as in the first exemplary embodiment, it being understood that the portion of the retraction device not shown in FIG. 7 is identical to that shown and described in FIGS. 2 through 6. Rod 81 comprises a plurality of block segments hinged along one side so as to be spirally foldable into a circular housing 82 when the belt is in the fully retracted position. The circular housing 82 may be an extension of a latch housing 83 having an opening 84 in the upper surface thereof. The rod 81 will be understood that to be constructed of material such as a resilient, deformable plastic material. In this embodiment, the dog element comprises a pivotally mounted arm 85 having a rectangular opening 86 through which the rod 81 passes. The arm 85 is angularly disposed to the axis of the rod 81 and biased to this position by a spring 87. As seen in FIG. 7, the arm may be also of plastic and integral with the base of the housing. The opening 86 in the arm 86 is rectangular and the edges of the opening are spaced from the rod when the arm is in a plane substantially normal to the axis of the rod as when the arm is pivoted rearwardly. The top and bottom edges of the opening 86 are in the same plane as the top and bottom surface of the rectangular cross section rod 81 so that the rod may freely pass therethrough when the arm 85 is angularly disposed to the axis of rod 81. When the arm 85 is angularly disposed as shown in FIG. 7, the rearward upper edge of the opening 86 prevents the rod 81 from moving in a direction to the right as viewed in FIG. 7. However, the rod 81 is free to move in the direction to the left as when the buggy is being moved to the rear of the housing during protraction of the belt 20. Thus, the buggy is maintained in the belt-protracted position by means of the arm 85. When it is desired to release the rod so that the belt may be retracted, the arm 85 is pivoted so that the opening 86 is normal to the rod 81 whereby the rod may freely pass therethrough.

While a single exemplary embodiment of the retraction means and several exemplary embodiments of releasable latching means have been shown and described, it will be apparent to those skilled in the art that other modifications and variations of the present invention are possible in light of the above teachings. It is therefore to be understood that within the scope of the appended claims, the invention may be practiced otherwise than as specifically described.

We claim:

1. In a safety belt restraint system including at least one safety belt having a connector at one end thereof, the provision of:

retraction means comprising an elongated frame, a buggy mounted for limited longitudinal movement with respect thereto from a retracted belt position to a protracted belt position, the other end of the safety belt secured to said frame and having an intermediate portion engaging said buggy, and means biasing said belt to the retracted position; and releasable latching means for maintaining said buggy in the protracted position including an elongated rod carried by said buggy, a spring-biased pivotally mounted dog element engaging said elongated rod and preventing movement of said buggy when said belt is fully protracted, and a member selectively movable and slidably mounted on said frame and including a portion of camming said dog element so as to disengage said dog element and rod whereby said retraction means buggy will move to the belt-retracted position.

2. The provision of claim 1 wherein said safety belt is secured at one end of said frame, said frame including a roller rotatably supported adjacent said end, and said safety belt extending from said securement around said buggy so as to define a first lay, back toward said roller so as to define a second lay, and around said roller so as to define a third lay disposed around the restraint system occupant when in use.

3. The provision of claim 1 wherein said movable member includes a hooklike portion received in an opening in the safety belt connector so that upon engagement of said connector with said hooklike portion, when the safety belt is in the fully protracted and tensionless condition, and manual movement of said connector and movable member, said dog and elongated rod will be disengaged whereby said buggy will be biased to the retracted belt position and the belt will be drawn taut adjacent said frame.

4. In a safety belt restraint system including at least one safety belt having a connector at one end thereof, the provision of:

retraction means comprising an elongated frame, a buggy mounted for limited longitudinal movement with respect thereto from a retracted belt position to a protracted belt position, the other end of the safety belt secured to said frame at one end thereof, said frame including a roller rotatably supported adjacent said end, and said safety belt extending from said securement around said buggy so as to define a first lay, extending back towards said roller so as to define a second lay, and extending around said roller so as to define a second lay, and extending around said roller so as to define a third lay, said last-mentioned lay comprising the operative passenger-engaging portion of the safety belt when in use, and means biasing said belt to the retracted position; and releasable latching means for maintaining said buggy in the protracted position, including a rod elongated in the direction of movement of and carried by said buggy, a biased dog element engaging said rod and preventing movement thereof when said belt is fully protracted, and a selectively movable member for disengaging said dog and rod whereby the buggy will move to the belt retracted position.

5. The provision of claim 4 wherein said rod comprises a plurality of block segments hinged along one side and spirally foldable into a circular housing when said belt is in the fully retracted position.

6. The provision of claim 5 wherein said biased dog element comprises a pivotally mounted arm having a rectangular opening through which said rod passes, the edges of said opening engaging said rod and preventing movement thereof in one direction when said arm is angularly disposed to the axis of said rod, the edges of said opening being spaced from said rod when said arm and opening are in a plane substantially normal to the axis of said rod, said arm normally spring biased into a plane disposed at an angle to the longitudinal axis of said rod, and said selectively movable member is mounted on the end of said arm.

7. The provision of claim 4 wherein said rod is straight and inflexible and secured to the buggy at one end thereof and carries a head portion at the other end thereof, said spring-biased dog element being pivotally mounted on said frame, and said movable member being slidably mounted on said frame and including a portion for camming said dog element to an inoperative position so as to disengage said head portion of said rod allowing movement thereof.

UNITED STATES PATENT OFFICE
CERTIFICATE OF CORRECTION

Patent No. 3,583,763  Dated  June 8, 1971

Inventor(s)  Raymond J. Settimi et al.

It is certified that error appears in the above-identified patent and that said Letters Patent are hereby corrected as shown below:

Column 1, line 58, "of the" should read -- other --. Column 2, line 61, "sahped" should read -- shaped --. Column 3, line 40, "mover" should read -- moved --; line 72, "86", second occurrence, should read -- 85 --. Column 4, line 42, "of" should read -- for --.

Signed and sealed this 7th day of March 1972.

(SEAL)
Attest:

EDWARD M. FLETCHER, JR.  ROBERT GOTTSCHALK
Attesting Officer  Commissioner of Patents